United States Patent
Tamir et al.

(10) Patent No.: US 11,575,586 B2
(45) Date of Patent: Feb. 7, 2023

(54) END-TO-END SERVICE LEVEL METRIC APPROXIMATION

(71) Applicant: Microsoft Technology Licensing, LLC, Redmond, WA (US)

(72) Inventors: Gal Tamir, Petch Tiqwa (IL); Zakie Mashiah, Qiryat Ono (IL); Adir Hudayfi, Eilat (IL); Tamar Agmon, Ramat-Gan (IL); Yosef Asaf Levi, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/356,130

(22) Filed: Jun. 23, 2021

(65) Prior Publication Data

US 2022/0417115 A1    Dec. 29, 2022

(51) Int. Cl.
*H04L 41/5009* (2022.01)
*H04L 41/5019* (2022.01)
*H04L 47/70* (2022.01)
*H04L 12/28* (2006.01)

(52) U.S. Cl.
CPC .......... *H04L 41/5009* (2013.01); *H04L 12/28* (2013.01); *H04L 41/5019* (2013.01); *H04L 47/827* (2013.01)

(58) Field of Classification Search
CPC ... H04L 41/5009; H04L 12/28; H04L 47/827; H04L 41/5019
See application file for complete search history.

(56) References Cited

U.S. PATENT DOCUMENTS

| | | | |
|---|---|---|---|
| 10,728,117 | B1 | 7/2020 | Sharma et al. |
| 2014/0269269 | A1 | 9/2014 | Kovvali et al. |
| 2016/0350173 | A1* | 12/2016 | Ahad ................... G06F 11/0793 |
| 2016/0366243 | A1* | 12/2016 | Chefalas ................. H04L 67/32 |
| 2018/0039555 | A1* | 2/2018 | Salunke ............. G06F 11/3034 |
| 2018/0115463 | A1* | 4/2018 | Sinha .................. H04L 41/5067 |
| 2020/0008084 | A1 | 1/2020 | Das et al. |
| 2020/0267057 | A1* | 8/2020 | Garvey ................. H04L 41/142 |
| 2020/0358669 | A1* | 11/2020 | Sinha ...................... H04L 43/10 |
| 2021/0211347 | A1* | 7/2021 | Vasseur ................... H04L 67/10 |
| 2021/0360059 | A1* | 11/2021 | Savalle ............... H04L 41/5025 |
| 2022/0086053 | A1* | 3/2022 | Gonguet ............... H04L 41/142 |

OTHER PUBLICATIONS

Alspach, Kyle, "Microsoft Apologizes For Another Azure, Teams Outage", Retrieved from: https://www.crn.com/news/cloud/microsoft-apologizes-for-another-azure-teams-outage, Apr. 2, 2021, 11 Pages.
"International Search Report and Written Opinion Issued in PCT Application No. PCT/US22/029513", dated Aug. 10, 2022, 10 Pages.

* cited by examiner

*Primary Examiner* — Joe Chacko

(57) ABSTRACT

Described are examples for providing service level monitoring for a network hosting applications as a cloud service. A service level monitoring device may receive end-to-end measurements of service usage collected at user devices for a plurality of applications hosted as a cloud services. The service level monitoring device may determine degraded applications of the plurality of applications based on anomalies in the measurements. The service level monitoring device may determine a service level metric based on an aggregation of the degraded applications. In some examples, the service level monitoring device may detect a network outage affecting the service.

20 Claims, 8 Drawing Sheets

END-TO-END SERVICE LEVEL METRIC APPROXIMATION

BACKGROUND

A cloud provider may host cloud applications for its clients. The cloud provider offers various methods and services to accelerate development of the application development time. For example, a cloud provider may provide infrastructure as a service (IaaS) services such as virtual machines (VM), platform as a service (PaaS) services such as databases and serverless computing, and software as a service (SaaS) services such as authentication platforms.

A cloud service provider may make a measurable service level agreement (SLA) with the client during service onboarding. The SLA may provide for service level monitoring by the service provider and reporting of any degradation in the service quality to the client.

A cloud service provider may face difficulties in measuring the performance characteristics for compliance with the SLA. Generally, the cloud service provider may measure service level based on the requests that reach its resources. An end user, however, may experience performance based on end-to-end communications from a user device to one or more devices in the cloud system that provide the service. For example, each request for a service in the cloud system may travel through multiple services such as a virtual machine, a virtual private network, a traffic manager, a firewall, or an application gateway before reaching the monitored service. Accordingly, from the perspective of the user, a poor experience may be attributed to the cloud service.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, the disclosure provides an apparatus for monitoring a service level in a network. The apparatus includes a memory storing instructions for managing applications on the network as cloud services and at least one processor coupled to the memory and configured to execute the instructions. The at least one processor is configured to receive end-to-end measurements of service usage collected at user devices for a plurality of applications hosted on the network as cloud services. The at least one processor is configured to determine degraded applications of the plurality of applications based on anomalies in the measurements. The at least one processor is configured to determine a service level metric based on an aggregation of the degraded applications.

In some implementations, the at least one processor is configured to receive the end-to-end measurements from a monitoring application installed on the user devices.

In some implementations, the at least one processor is configured to receive third party measurements for an application.

In some implementations, the end-to-end measurements are from a set of users that have opted in to an application performance management service. To determine the degraded applications of the plurality of applications based on the anomalies in the measurements, the at least one processor may be configured to estimate measurements for all users of the application based on the set of users that have opted in to the application performance management service.

In some implementations, to detect the anomalies in the measurements, the at least one processor is configured to determine that the measurements for at least one application of the plurality of applications indicate that the application was unavailable.

In some implementations, the service usage includes a call from a user application to a platform as a service application that is accessed by the plurality of applications hosted as cloud services.

In some implementations, to determine the service level metric based on an aggregation of the degraded applications, the at least one processor is configured to determine an availability rate or end-to-end latency of the plurality of applications hosted on the wide area network.

In some implementations, the at least one processor is configured to: detect a region and a uniform resource identifier (URI) of the degraded applications; map the URI and an internet protocol address of the degraded applications to logical and physical resources in the wide area network based on the region; and detect an outage within the wide area network based on the mapping.

In some implementations, the at least one processor is configured to adjust an allocation of network resources based on the service level metric and a service level agreement.

In another example, the disclosure provides a method of measuring service levels in a network that hosts cloud services. The method includes receiving end-to-end measurements of service usage collected at user devices for a plurality of applications hosted on the network as cloud services. The method includes determining degraded applications of the plurality of applications based on anomalies in the measurements. The method includes determining a service level metric based on an aggregation of the degraded applications.

In another example, the disclosure provides a system for monitoring a service level in a WAN. The system includes the WAN including a plurality of geographically distributed physical computing resources and connections there between. The system includes a service level component including a memory storing one or more parameters or instructions for monitoring a service level on the WAN and at least one processor coupled to the memory. The at least one processor is configured to execute the instructions to receive end-to-end measurements of service usage collected at user devices for a plurality of applications hosted on the wide area network as cloud services. The at least one processor is configured to execute the instructions to determine degraded applications of the plurality of applications based on anomalies in the measurements. The at least one processor is configured to execute the instructions to determine a service level metric based on an aggregation of the degraded applications.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
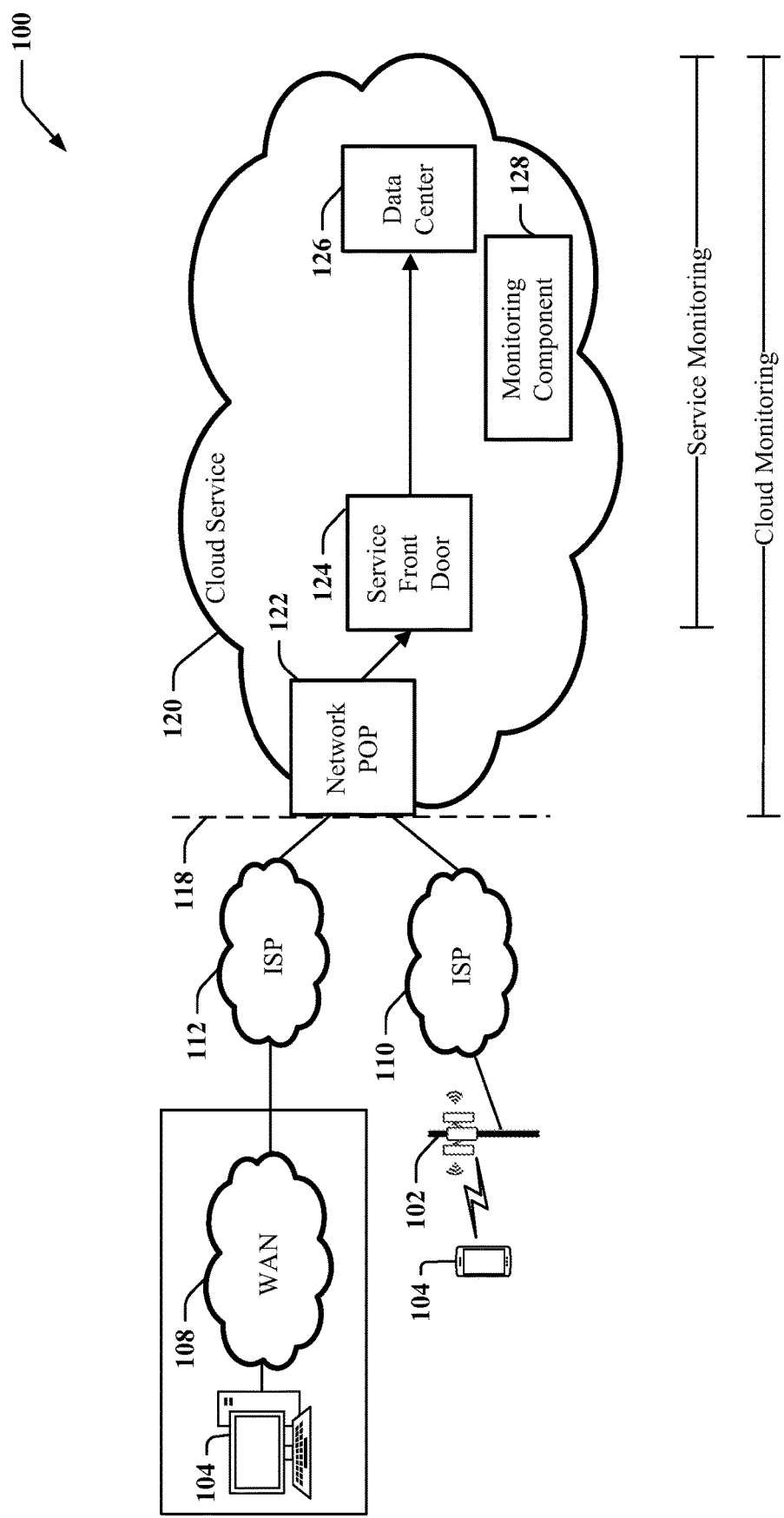
FIG. 1 is a diagram of an example of an architecture for monitoring a service level of a cloud service.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to measuring an end-to-end service level provided by a wide area network (WAN) hosting a plurality of applications as cloud services. For example, the a platform as a service (PaaS) operator may utilize the WAN as a PaaS system. A PaaS operator may instrument an application on a portion of user devices utilizing a service hosted in on the WAN. For example, the instrumentation may be implemented in a browser application or a service specific application installed on the user device. The instrumentation may collect data related to performance of the service. In particular, the data may include end to end measurements such as end-to-end latency of requests to the service. In some implementations, the instrumentation may be optional and one or both of a user/customer and an end-user may opt in or opt out of providing data.

A service level component may collect the end-to-end measurements. The service level component may be controlled by the PaaS operator. For example, the service level component may be a hardware device connected to the WAN or software executed on physical resources of the WAN (e.g., a server). The service level component may analyze the end-to-end measurements to detect anomalies. For example, an anomaly may include a measured end-to-end metric for an application being outside of normal operating boundaries, which may be set by the operator and/or based on past measurements. The service level component may determine degraded applications based on the anomalies. Due to variations in service usage and the possibility of issues outside of the control of the PaaS operator, a single degraded application may not be indicative of a service level being provided by the PaaS operator. In an aspect, the service level component may determine a service level metric based on an aggregation of degraded applications. For example, the service level component may determine that hosted services are not available when a threshold number of degraded applications are detected. Similarly, the service level component may determine a latency metric based on a number of applications experiencing degraded performance with respect to latency. Accordingly, by aggregating information about multiple degraded applications, the service level component may generate service level metrics for the PaaS.

In some implementations, the service level component may attempt to improve network performance in response to the service level metrics. For example, the service level component may identify outages inside or outside of the WAN based on the degraded applications. As another example, the service level component may allocate network resources to improve the service level metric.

Figure 4:
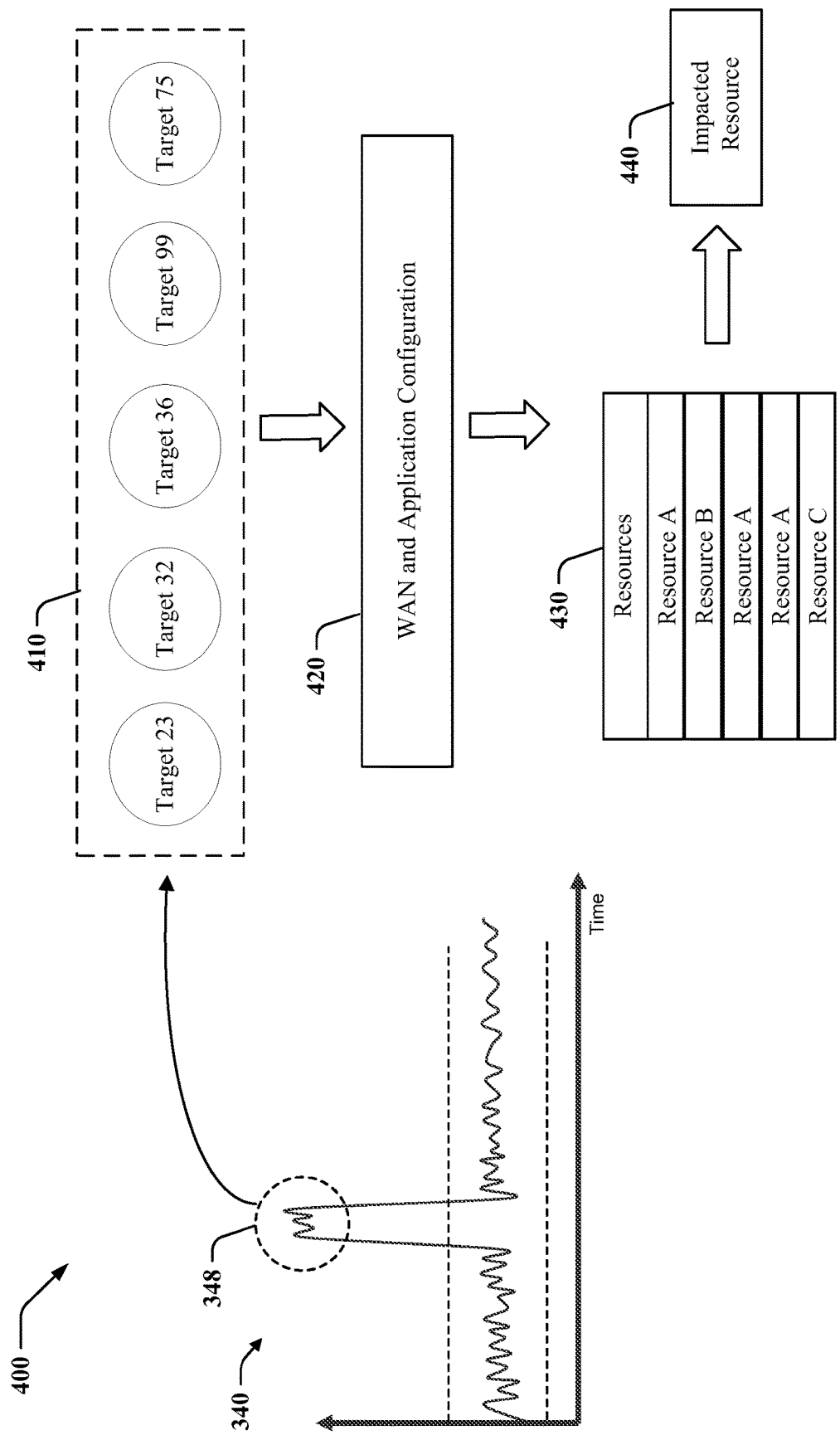
FIG. 4 is a conceptual diagram of an example of identifying a resource outage based on aggregated metrics, in accordance with aspects described herein.
Figure 5:
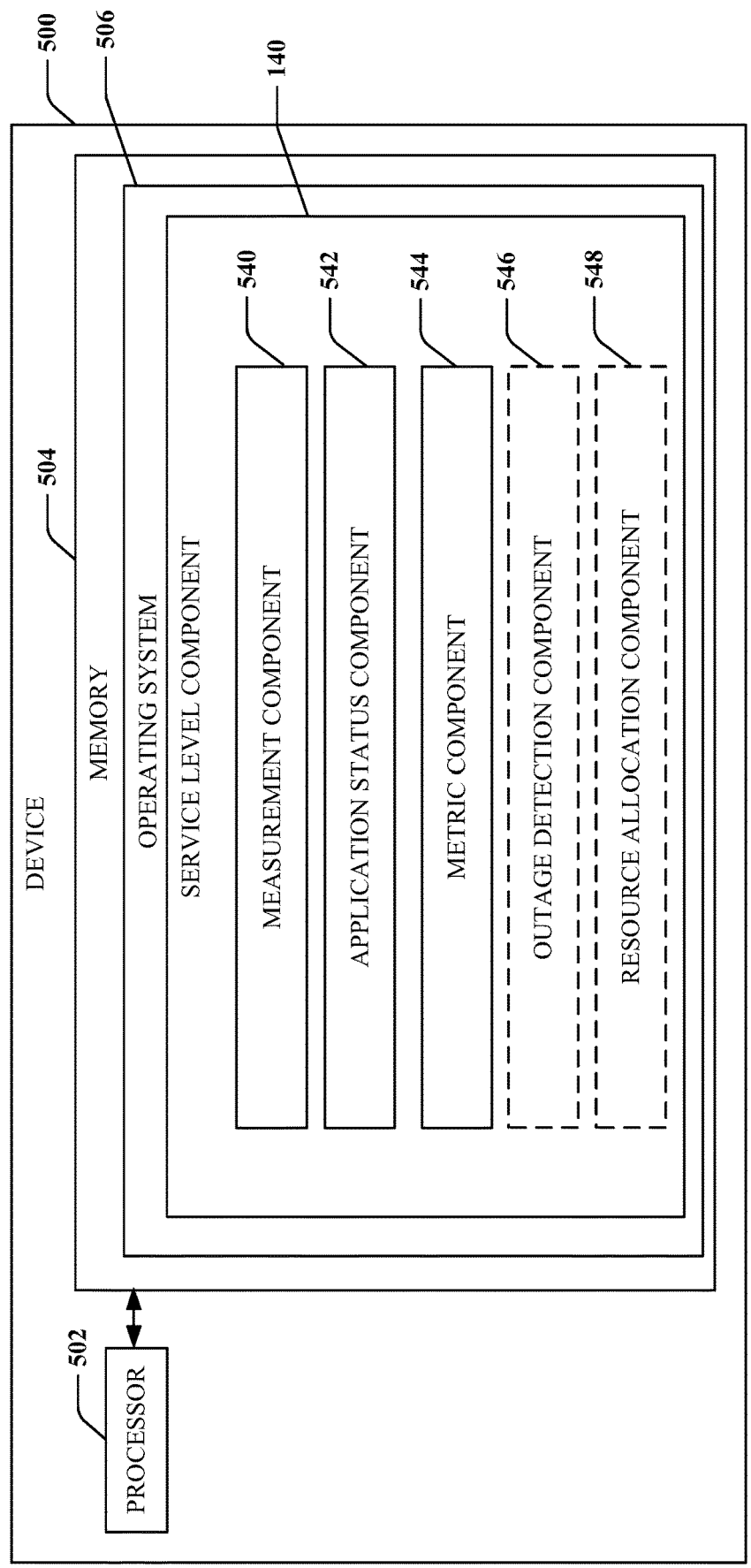
FIG. 5 is a schematic diagram of an example device for monitoring an end-to-end service level, in accordance with aspects described herein.
Figure 6:
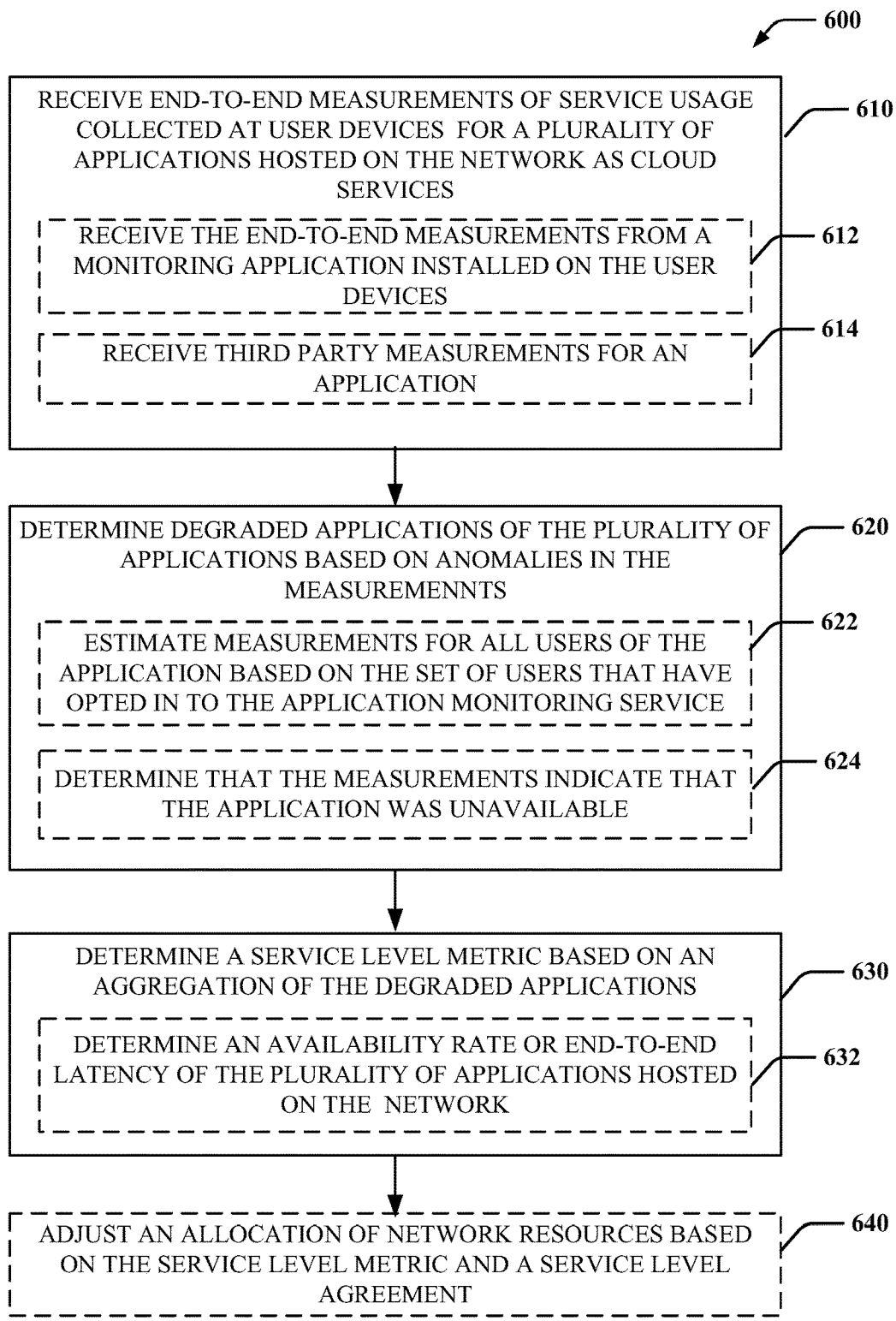
FIG. 6 is a flow diagram of an example of a method of monitoring an end-to-end service level, in accordance with aspects described herein.
Figure 7:
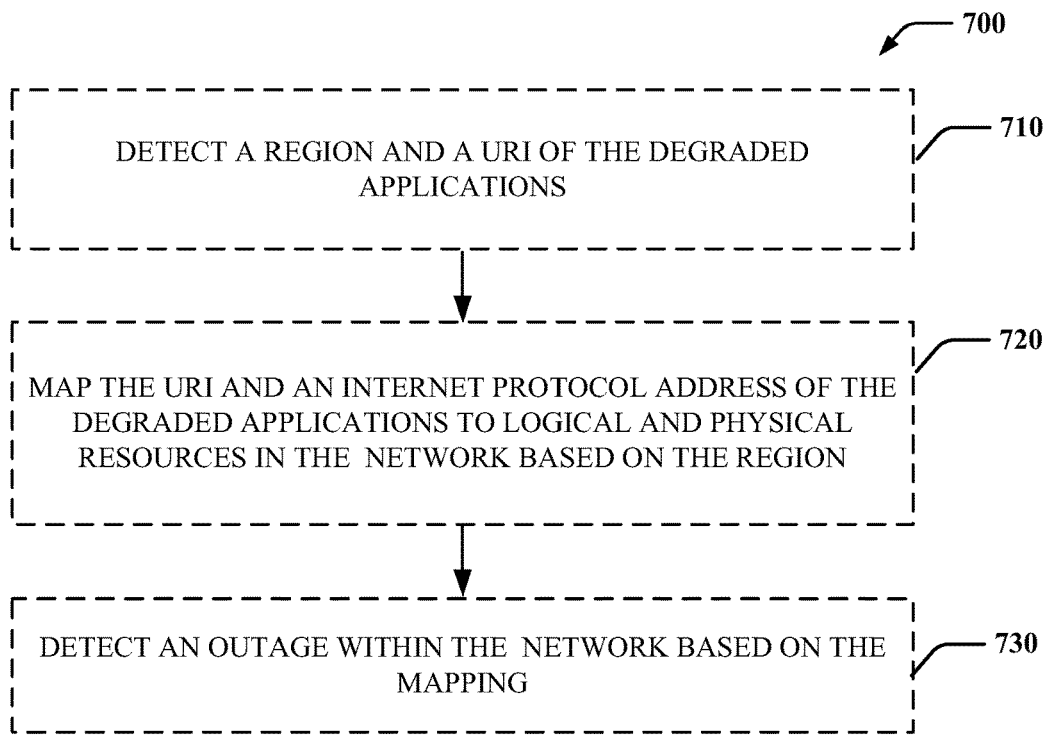
FIG. 7 is a flow diagram of an example of a method of detecting an outage in a wide area network, in accordance with aspects described herein.

Turning now to FIGS. 1-8, examples are depicted with reference to one or more components and one or more methods that may perform the actions or operations described herein, where components and/or actions/operations in dashed line may be optional. Although the operations described below in FIGS. 6 and 7 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a diagram of an example of an architecture 100 for monitoring a service level of a cloud service (e.g., a PaaS). The cloud service may be hosted in a WAN 120 including a plurality of geographically distributed physical computing resources and connections there between. User devices 104 may connect to the service hosted in the WAN 120 via one or more networks. For example a mobile user device 104 may connect to a radio access network (RAN) via a base station 102. A RAN operator may act as an Internet service provider (ISP) to forward packets from the mobile user device 104 to the WAN 120. As another example, an enterprise user device 104 may connect to an enterprise WAN 108. The enterprise WAN 108 may connect directly to the WAN 120, or connect via an ISP 112.

The WAN 120 may generally include a point of presence (POP) 122, a service front door 124, and a data center 126. The POP 122 may be a gateway server or router of the WAN 120. The POP 122 may be located at a peering location for physical connections to other networks (e.g., ISP 110, ISP 112, or enterprise WAN 108). The POP 122 may form a boundary 118 between the WAN 120 and outside networks. The POP 122 may receive traffic from the other networks (including traffic from user devices 104) and route the traffic to WAN resources responsible for the service (e.g., a service front door 124). In some implementations, the POP 122 may perform services such as traffic management and firewall, which may be considered cloud services, but may not necessarily be considered PaaS services. That is, the traffic management and firewall services may be generic services for all traffic on the WAN 120, not just the PaaS system. In some implementations, a PaaS telemetry performing service monitoring may not include the traffic management and firewall. The service front door 124 may be a server that receives requests for a service. The service front door 124 may process the requests and/or determine other network nodes to handle the request. For example, the service front door 124 may provide the request to a resource subnet assigned to a PaaS service. The service front door may establish a session between the user device 104 and a data center 126 for ongoing communications for the service. The data center 126 may include the resource subnet for providing a PaaS service. Example PaaS services may include databases, database management systems (DBMS), or messaging systems.

In an aspect, a monitoring component 128 may monitor service provided by the WAN 120. The monitoring component 128 may be controlled by the PaaS operator and may communicate with other nodes in the WAN 120. The monitoring component 128, however, may not be able to monitor past the boundary 118. For example, the monitoring component 128 may perform cloud monitoring to determine a latency between the network POP 122 and the data center 126. In an aspect, such measurements may be useful for determining the performance of the WAN 120 and may allow the PaaS operator to determine whether a SLA is being met. In some cases, measurements for the PaaS telemetry for service monitoring may exclude some services of the WAN 120 (e.g., firewall).

Cloud monitoring and service monitoring measurements within the WAN 120, however, may not necessarily represent an experience of an end user with a PaaS service hosted in the WAN 120. As an extreme example, an ISP 110 may include a domain name server (DNS) that is improperly configured for the WAN 120 or a service hosted on the WAN 120. A user device 104 attempting to access the service may receive an incorrect IP address and be unable to access the service. From the point of view of the monitoring component 128, all requests for the service received at the POP 122 may be handled and meet the SLA. The affected users, however, may perceive the service as unavailable. As another example, an improperly configured firewall may block traffic from reaching the service front door 124 and render the service unavailable from the perspective of the user. Less extreme examples may include connectivity issues or latency in the RAN, the enterprise WAN 108, or the network POP 122.

Figure 2:
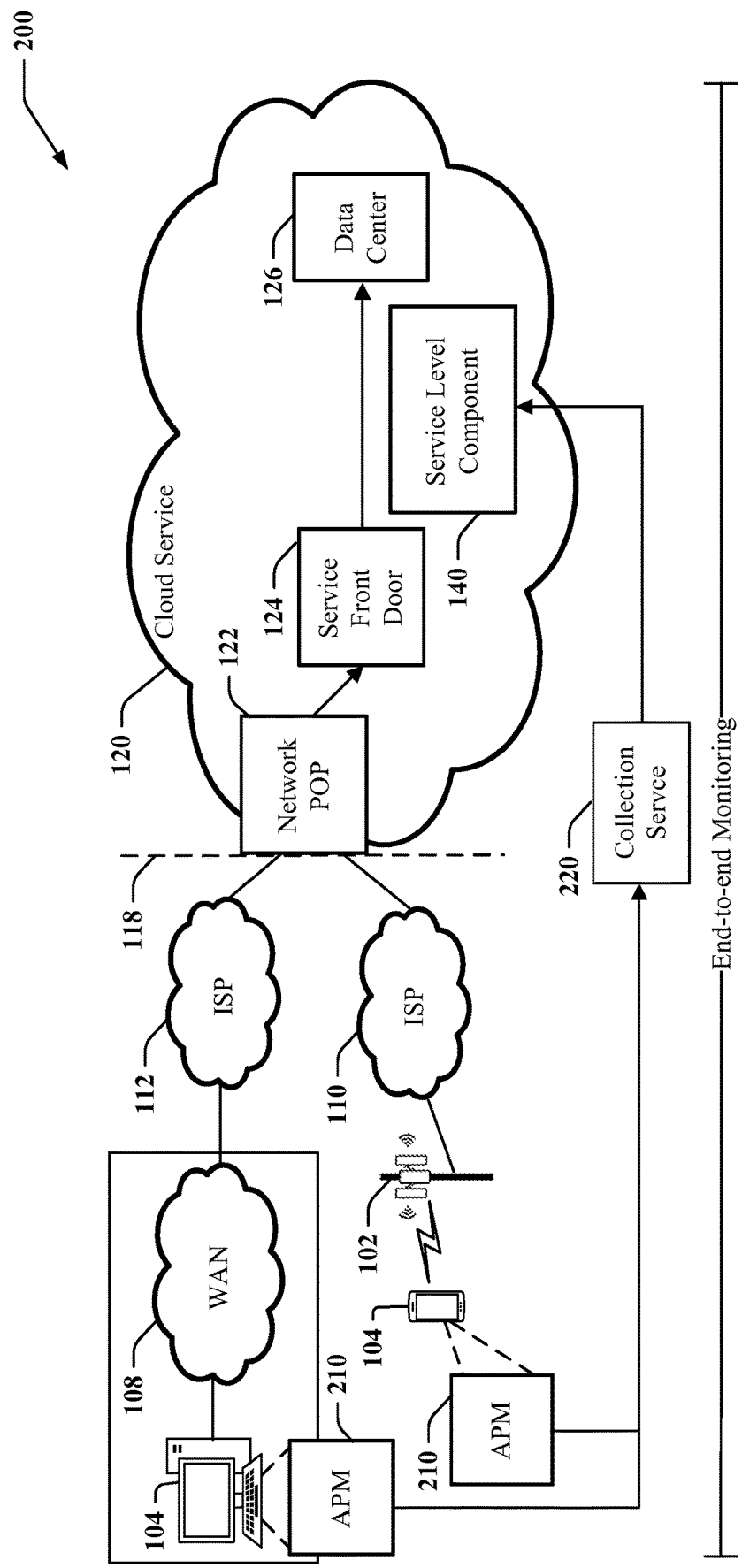
FIG. 2 is a diagram of an example of an architecture for monitoring an end-to-end service level for an application hosted as a cloud service, in accordance with aspects described herein.

FIG. 2 is a diagram of an example of an architecture 200 for monitoring an end-to-end service level for an application hosted as a cloud service. The architecture 200 may include some of the same components as the architecture 100. For example, the architecture 200 may include the user device 104, the base station 102, the enterprise WAN 108, the ISPs 110, 112, and the WAN 120. The architecture 200 may similarly include the network POP 122, the service front door 124, and the data center 126 in the WAN 120. The architecture 200 may also include an application performance management (APM) 210 service at a plurality of the user devices 104, a collection service 220, and a service level component 140.

The APM 210 may include instrumentation executable by the user device 104 to monitor an application. The APM 210 service may be specific for an individual service hosted in the WAN 120. For example, the WAN 120 may host a web service that is accessible via a web browser on a user device 104. The APM 210 service for such a web service may include code or a script on a website that performs various measurements of requests. As another example, the WAN 120 may host a service with a corresponding application installed on the user device 104. The application on the user device 104 may perform various measurements of requests to the service hosted on the WAN 120.

In an aspect, participation in the APM 210 may be optional. For example, in some implementations, the WAN 120 may provide tools for the APM 210. For instance, a PaaS operator may provide an application programming interface (API) and/or software development kit (SDK) that provides access to the instrumentation for inclusion in cloud applications. A cloud application that chooses to host the service on the WAN may activate the APM within the end-user application or on a website. In some implementations, the end user of a user device 104 may choose whether to participate in the APM 210. For example, participation options may be displayed within the application or by a browser in connection with a website. In some other implementations, the APM 210 may be provided by a third party. For instance, the third party may offer the APM to a service provider or end user.

The APM 210 may provide end-to-end measurements that are collected at the user devices 104 to a collection service 220. The collection service 220 may be controlled by a service provider, the PaaS operator, or a third party. The collection service 220 may provide the measurements to the service level component 140. For example, a collection service controlled by a PaaS operator may provide the measurements to the service level component 140 of the PaaS operator to improve performance of the application. A third party collection service 220 may provide the measurements as a service to any of the end user, cloud application, or PaaS operator. For example, a PaaS operator may purchase measurements collected by the third party to improve service. In some implementations, the collection service 220 may perform some processing of the measurements. For instance, the collection service 220 may perform anonymization and/or aggregation of the measurements for an application from multiple users of the application.

The service level component 140 may receive end-to-end measurements of service usage collected at user devices 104 for a plurality of applications hosted on the wide area network as a cloud service. As discussed above, the measurements may be collected by different parties. The service level component 140 may receive the end-to-end measurements from different sources, for example, for different applications. The service level component 140 may determine degraded applications of the plurality of applications based on anomalies in the measurements. The service level component 140 may determine a service level metric based on an aggregation of the degraded applications.

Figure 3:
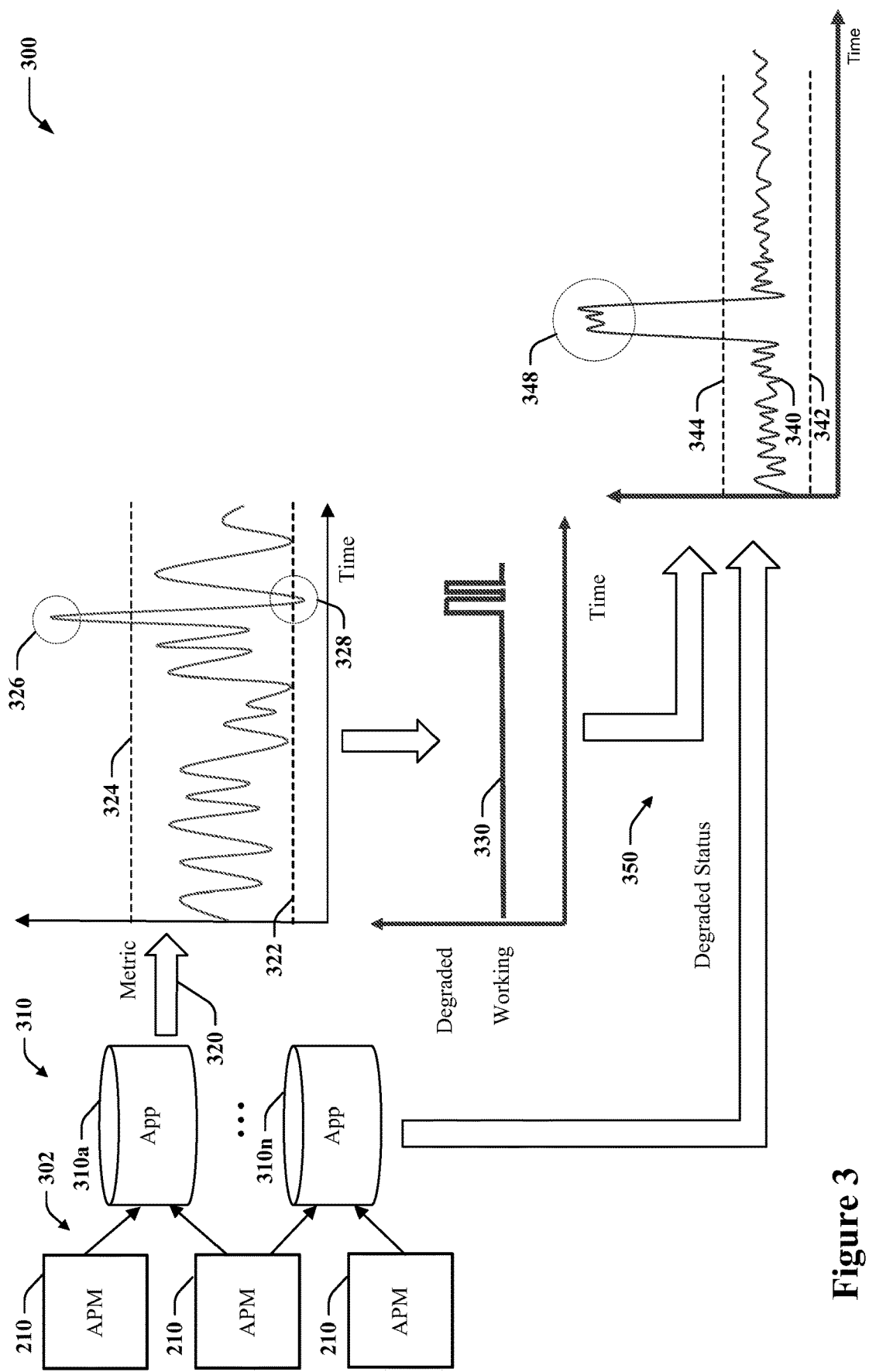
FIG. 3 is a conceptual diagram of an example of aggregating metrics for multiple applications, in accordance with aspects described herein.

FIG. 3 is a conceptual diagram 300 of an example of aggregating metrics 320 for multiple applications 310 (e.g., applications 310*a* . . . 310*n*). In some implementations, each of the applications 310 uses a same PaaS service such as a database. Although the collected measurements may relate to performance of different applications, an aggregation of the metrics may provide a useful service level metric for a PaaS service. As noted above, the APMs 210 may collect end-to-end measurements of an application. The service level component 140 may receive the measurements. In some implementations, the collection service 220 may aggregate the measurements for each application 310 hosted on the WAN 120. In other implementations, the service level component 140 may sort the measurements into a bin for each application 310. The service level component 140 may determine a metric 320 for each application (e.g., application 310a) based on the measurements in the bin for the application. The metric 320 may be expressed as a time series. Example metrics may include: average latency, results' code, exception data, number of users or sessions, bandwidth of application, etc.

In some cases, the measurement reporting and/or APM 210 may be optional for users. Accordingly, the received measurements may be a sample of performance. The service level component 140 may estimate measurements for all users of the application (e.g., application 310a) based on the set of users that have opted in to the application monitoring service. For instance, for a metric that is an average value, the average of the available measurements may be a good estimate of the average for all users. A metric that is a total may be estimated based on a percentage of the users that have opted into the measurement reporting.

The service level component 140 may determine degraded applications of the plurality of applications 310 based on anomalies in the measurements. For example, the service level component 140 may compare the metric 320 to boundaries indicating normal usage. For instance, a lower boundary 322 and an upper boundary 324 for a metric may be configured by a WAN operator (e.g., based on an SLA) or set based on historical observations. The lower boundary 322 and an upper boundary 324 may be dynamic boundaries (e.g., depending on time of day or day of week). The service level component 140 may identify anomalies 326 or 328, for example, when the metric 320 is outside of the boundaries 322, 324. Each anomaly 326 or 328 may be associated with a time period when the anomaly occurs.

The service level component 140 may determine a status 330 for each application 310 over. For example, the status 330 may be either "working" or "degraded." A degraded status may indicate that an anomaly was detected in one or more metrics of the application for a period of time.

The service level component 140 may determine a service level metric based on an aggregation 340 of the degraded applications. For example, the service level component 140 may aggregate the status 330 for the plurality of applications 310. In an aspect, the plurality of applications 310 may include applications for different customers of the cloud provider. Accordingly, an aggregation of the applications with a degraded status may be an availability metric for services provided by the WAN 120. For instance, if the aggregation 340 for the number of applications with a degraded status is less than a threshold 344, the services hosted by the WAN 120 may be considered available to end-users. In contrast, if the aggregation 340 exceeds the 344, an unavailability period 348 may be detected. In some cases, an unavailability period may be detected if the aggregation 340 is less than a lower threshold 342. In another example, the aggregation 340 may be expressed as a percentage of total applications 310 that are available to end users. Other metrics may be derived based on an aggregation. For example, a latency measurement or excess latency measurement for each of the degraded applications may be aggregated as an average or total to represent latency experienced by users of the WAN 120.

FIG. 4 is a conceptual diagram 400 of an example of identifying a resource outage based on aggregated metrics. As discussed above with respect to FIG. 3, an aggregation 340 may be used to detect an unavailability period 348. The service level component 140 may further analyze the degraded applications during the unavailability period 348 to determine whether the unavailability is associated with an outage of a network resource.

The service level component 140 may identify target applications 410 based on the degraded applications during the unavailability period 348. In a cloud service, a particular application may be hosted on different resources in the WAN 120. For example, an application may be associated with multiple service front doors 124 or data centers 126. Because the target applications 410 are identified based on end-to-end measurements, the target applications may be identified based on information available to the user devices 104 such as a uniform resource identifier (URI) and internet protocol (IP) address. Further, a region (e.g., a country, state, metro, or POP 122) may be identified for the user. The service level component 140 may map the URI and IP address of the degraded applications to logical and physical resources in the WAN 120 based on the region. For instance, the service level component 140 may use a WAN and application configuration 420 to determine the logical and physical resources 430 responsible for serving the users associated with the degraded applications. The service level component 140 may detect an outage within the WAN 120 based on the mapping. For instance, the service level component 140 may identify common resources in the resources 430 to identify potential impacted resources 440 that may be responsible for the outage. In some implementations, the impacted resources 440 may include resources outside of the WAN 120. For example, the region, URI, and IP address may identify an ISP 110 as a potential outage, especially if measurements from users via a different ISP 112 do not indicate degraded performance.

FIG. 5 is a schematic diagram of an example of a device 500 (e.g., a computing device) for providing service level metrics for cloud services hosted on a WAN. The device 500 may be implemented on a physical resource within the WAN 120. For instance, the device 500 may be implemented at a server. The device 500 may communicate with a service provider via a portal, which may be accessed from outside the underlying WAN 120 (e.g., via a website).

In an example, device 500 can include a processor 502 and/or memory 504 configured to execute or store instructions or other parameters related to providing an operating system 506, which can execute one or more applications or processes, such as, but not limited to, at least one of the service level component 140 for providing service level metrics for cloud services hosted on a network. For example, processor 502 and memory 504 may be separate components communicatively coupled by a bus (e.g., on a motherboard or other portion of a computing device, on an integrated circuit, such as a system on a chip (SoC), etc.), components integrated within one another (e.g., processor 502 can include the memory 504 as an on-board component), and/or the like. Memory 504 may store instructions, parameters, data structures, etc. for use/execution by processor 502 to perform functions described herein.

In an example, the service level component 140 may optionally include one or more of a measurement component 540 configured to receive end-to-end measurements of service usage collected at user devices for a plurality of applications hosted on the wide area network as a cloud service, an application status component 542 configured to determine degraded applications of the plurality of applications based on anomalies in the measurements, and a metric component 544 configured to determine a service level metric based on an aggregation of the degraded applications.

In some implementations, the service level component 140 may include an outage detection component 546 configured to detect an outage within the WAN 120 based on the service level metric. In some implementations, the service level component 140 may include a resource allocation component 548 configured to adjust an allocation of network resources based on the service level metric and a service level agreement.

The measurement component 540 may receive end-to-end measurements from the collection service 220. In some implementations, the measurement component 540 may implement the collection service 220. For example, the measurement component 540 may establish a reporting address for the APMs 210 executing on user devices. Accordingly, the measurement component 540 may receive the end-to-end measurements from the user devices. In other implementations, the measurement component 540 may receive the end-to-end measurements from one or more collection services 220 controlled by service providers that host services on the WAN 120 and/or from third parties that collect measurements. In an aspect, the measurement component 540 may sort the end-to-end measurements into bins for each application 310. In some implementations, the measurement component 540 may derive metrics 320 based on the measurements.

The application status component 542 may receive the end-to-end measurements and/or derived metrics 320 from the measurement component 540. The application status component 542 may detect anomalies in the measurements and/or metrics. For example, the application status component 542 may compare the measurements and/or metrics to thresholds for the application. The thresholds may be set by a WAN operator, a service provider of the application, or determined based on past performance (e.g., an average metric value). In some implementations, the thresholds may be dynamic thresholds based on variable usage of the application. The application status component 542 may generate a status 330 for each application. In some implementations, the status 330 may be for a specific measurement or metric. The application status component 542 may generate multiple status values for an application. For instance, an application may have a working availability status but a degraded latency status.

The metric component 544 may receive the application status values from the application status component 542. The metric component 544 may generate the aggregation 340 for the degraded applications. The metric component 544 may determine the service level metric based on the aggregation 340 for degraded applications. In some implementations, the metric component 544 may provide the service level metric to one or more service providers that host applications on the WAN 120. For instance, the metric component 544 may provide one or more service level metrics for a time window (e.g., last week, last 30 days). In some implementations, the metric component 544 may provide a comparison of an end-to-end service level metric and internal WAN service level metrics. For example, the metric component 544 may present both an end-to-end availability metric and an internal availability metric.

The outage detection component 546 may receive an indication of a service level metric from the metric component 544. The outage detection component 546 may also access measurements from the measurement component 540 and application status values from the application status component 542. The outage detection component 546 may be configured with the WAN and application configuration 420. The outage detection component 546 may detect a region and a URI of the target applications 410. The outage detection component 546 may map the URI and an IP address of the target applications 410 to logical and physical resources 430 in the WAN 120 based on the region. The outage detection component 546 may detect an outage (e.g., an impacted resource 440) within the WAN 120 based on the mapping.

The resource allocation component 548 may receive the service level metric from the metric component 544. The resource allocation component 548 may be configured with one or more SLAs between the WAN operator and service providers. The resource allocation component 548 may compare the service level metrics to the SLAs to determine whether the SLA is being met. The resource allocation component 548 may adjust an allocation of network resources based on the service level metric and a service level agreement. For instance, if an SLA is not being met for an application, the resource allocation component 548 may increase the resources allocated to that application. In some implementations, the allocation of resources may be based on outages detected by the outage detection component. For example, in some cases, the outage detection component 546 may quickly detect a potential resource outage and impacted resources 440 based on a change in service level metrics. The resource allocation component 548 may allocate additional resources to applications that are assigned to impacted resources 440. Accordingly, the resource allocation component 548 may mitigate an impact of a resource outage on one or more applications and thereby improve the performance of the WAN 120.

FIG. 6 is a flow diagram of an example of a method 600 for providing end-to-end service level metrics for applications hosted as cloud services. For example, the method 600 can be performed by a device 500 and/or one or more components thereof to determine a service level metric.

At block 610, the method 600 includes receiving end-to-end measurements of service usage collected at user devices for a plurality of applications hosted on the network as cloud services. In an example, the service level component 140 and/or the measurement component 540, e.g., in conjunction with processor 502, memory 504, and operating system 506, can receive the end-to-end measurements 302 of service usage collected at user devices 104 for a plurality of applications 310 hosted on the WAN 120 as cloud services. In some implementations, at sub-block 612, the block 610 may optionally include receiving the end-to-end measurements from a monitoring application (e.g., APM 210) installed on the user devices 104. In some implementations, at sub-block 614, the block 610 may optionally include receiving third party measurements for an application. In some implementations, the end-to-end measurements are from a set of users that have opted-in to an application measurement service.

At block 620, the method 600 includes determining degraded applications of the plurality of applications based on anomalies in the measurements. In an example, the service level component 140 and/or the application status component 542, e.g., in conjunction with processor 502, memory 504, and operating system 506, can determine the degraded applications 350 of the plurality of applications based on anomalies 326, 328 in the measurements 302. In some implementations, at sub-block 622, the block 620 may optionally include estimating measurements for all users of the application based on the set of users that have opted-in to the application monitoring service. In some implementations, at sub-block 624, the block 620 may optionally include determining that the measurements indicate that the application was unavailable.

At block 630, the method 600 includes determining a service level metric based on an aggregation of the degraded applications. In an example, the service level component 140 and/or the metric component 544, e.g., in conjunction with processor 502, memory 504, and operating system 506, can determine a service level metric based on an aggregation 340 of the degraded applications 350. In some implementations, at sub-block 632, the block 630 may optionally include determining an availability rate or end-to-end latency of the plurality of applications 310 hosted on the WAN 120.

At block 640, the method 600 may optionally include adjusting an allocation of network resources based on the service level metric and a service level agreement. In an example, the service level component 140 and/or the resource allocation component 548, e.g., in conjunction with processor 502, memory 504, and operating system 506, can adjust an allocation of network resources based on the service level metric and a service level agreement.

FIG. 7 is a flow diagram of an example of a method 700 for detecting an outage of a service such as a PaaS service. For example, the method 700 can be performed by a device 500 and/or one or more components thereof to determine a service level metric. The method 700 may be performed in conjunction with the method 600, for example, in response to a value of a service level metric in block 630.

At block 710, the method 700 includes detecting a region and a URI of the degraded applications. In an example, the service level component 140 and/or the outage detection component 546, e.g., in conjunction with processor 502, memory 504, and operating system 506, can detect the region and the URI of the degraded applications 350.

At block 720, the method 700 includes mapping the URI and an IP address of the degraded applications to logical and physical resources in the network based on the region. In an example, the service level component 140 and/or the outage detection component 546, e.g., in conjunction with processor 502, memory 504, and operating system 506, can map the URI and the IP address of the degraded applications to logical and physical resources 430 in the WAN 120 based on the region.

At block 730, the method 700 includes detecting an outage within the network based on the mapping. In an example, the service level component 140 and/or the outage detection component 546, e.g., in conjunction with processor 502, memory 504, and operating system 506, can detect the outage (e.g., impacted resource 440) within the WAN 120 based on the mapping.

Figure 8:
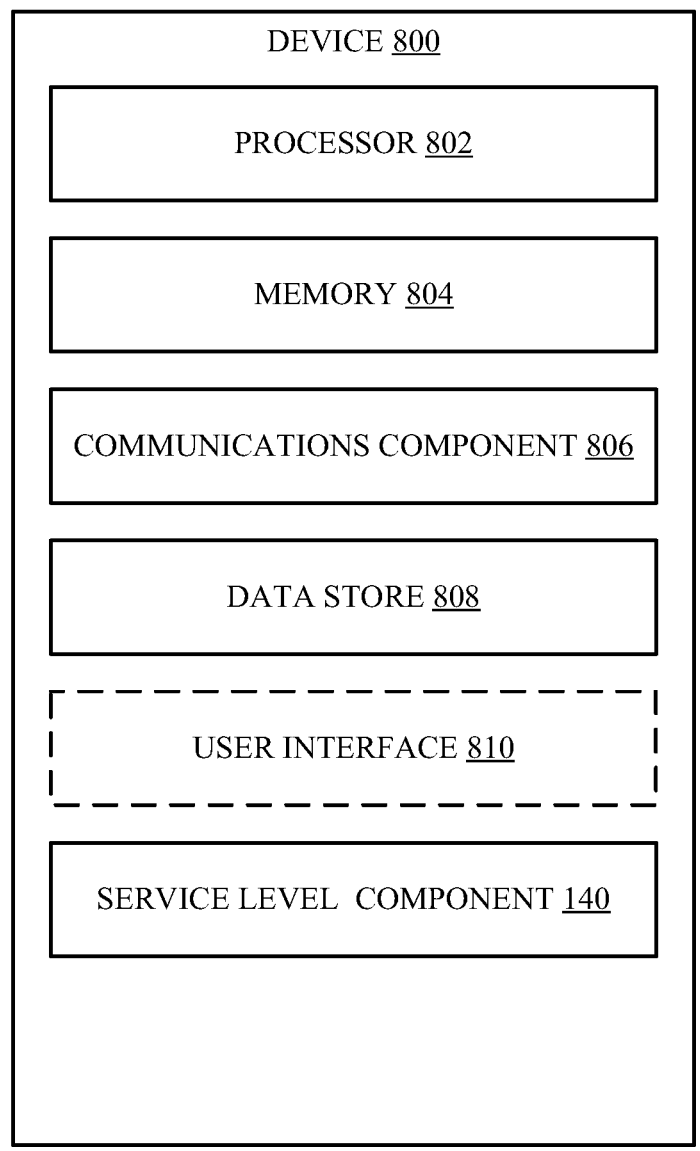
FIG. 8 is a schematic diagram of an example of a device for performing functions described herein, in accordance with aspects described herein.

FIG. 8 illustrates an example of a device 800 including additional optional component details as those shown in FIG. 5. In one aspect, device 800 may include processor 802, which may be similar to processor 502 for carrying out processing functions associated with one or more of components and functions described herein. Processor 802 can include a single or multiple set of processors or multi-core processors. Moreover, processor 802 can be implemented as an integrated processing system and/or a distributed processing system.

Device 800 may further include memory 804, which may be similar to memory 504 such as for storing local versions of operating systems (or components thereof) and/or applications being executed by processor 802, such as service level component 140, measurement component 540, application status component 542, metric component 544, etc. Memory 804 can include a type of memory usable by a computer, such as random access memory (RAM), read only memory (ROM), tapes, magnetic discs, optical discs, volatile memory, non-volatile memory, and any combination thereof.

Further, device 800 may include a communications component 806 that provides for establishing and maintaining communications with one or more other devices, parties, entities, etc. utilizing hardware, software, and services as described herein. Communications component 806 may carry communications between components on device 800, as well as between device 800 and external devices, such as devices located across a communications network and/or devices serially or locally connected to device 800. For example, communications component 806 may include one or more buses, and may further include transmit chain components and receive chain components associated with a wireless or wired transmitter and receiver, respectively, operable for interfacing with external devices.

Additionally, device 800 may include a data store 808, which can be any suitable combination of hardware and/or software, that provides for mass storage of information, databases, and programs employed in connection with aspects described herein. For example, data store 808 may be or may include a data repository for operating systems (or components thereof), applications, related parameters, etc. not currently being executed by processor 802. In addition, data store 808 may be a data repository for service level component 140.

Device 800 may optionally include a user interface component 810 operable to receive inputs from a user of device 800 and further operable to generate outputs for presentation to the user. User interface component 810 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 810 may include one or more output devices, including but not limited to a display, a speaker, a haptic feedback mechanism, a printer, any other mechanism capable of presenting an output to a user, or any combination thereof.

Device 800 may additionally include a service level component 140 for determining an end-to-end service level metric for applications hosted on a WAN 120, a measurement component 540 for receiving end-to-end measurements of service usage collected at user devices for a plurality of applications hosted on the wide area network as a cloud service, an application status component 542 for determining degraded applications of the plurality of applications based on anomalies in the measurements, a metric component 544 for determining a service level metric based on an aggregation of the degraded applications, etc. In some implementations, the service level component 140 may include an outage detection component 546 for detecting an outage within the WAN 120 based on the service level metric. In some implementations, the service level component 140 may include a resource allocation component 548 for adjusting an allocation of network resources based on the service level metric and a service level agreement.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus comprising:
   a memory storing instructions; and
   at least one processor coupled to the memory and configured to execute the instructions, wherein the at least one processor is configured to:
      receive end-to-end measurements of service usage collected at user devices for a plurality of applications hosted as cloud services;
      identify degraded applications of the plurality of applications based on anomalies in the measurements;
      detect a region and an identifier of the degraded applications;
      creating a mapping of the identifiers of the degraded applications to a resource in a network based on the region; and
      detect an outage within the network based on the mapping.

2. The apparatus of claim 1, wherein the at least one processor is configured to receive the end-to-end measurements from a monitoring application installed on the user devices.

3. The apparatus of claim 1, wherein the at least one processor is configured to receive third party measurements for an application.

4. The apparatus of claim 1, wherein the end-to-end measurements are from a set of users that have opted in to an application performance management service.

5. The apparatus of claim 4, wherein to identify the degraded applications of the plurality of applications based on the anomalies in the measurements, the at least one processor is configured to estimate measurements for all users of the application based on the set of users that have opted in to the application performance management service.

6. The apparatus of claim 1, wherein to detect the anomalies in the measurements, the at least one processor is configured to determine that measurements for at least one application of the plurality of applications indicate that the application was unavailable.

7. The apparatus of claim 1, wherein the service usage includes a call from a user application to a platform as a service application that is accessed by the plurality of applications hosted as cloud services.

8. The apparatus of claim 1, wherein at least one processor is configured to:
   determine a service level metric based on an aggregation of the degraded applications; and
   determine an availability rate or end-to-end latency of the plurality of applications hosted on the network.

9. The apparatus of claim 1, wherein:
   the identifier of the degraded applications is a uniform resource identifier (URI) of the degraded applications; and
   creating the mapping comprises mapping the URI and an internet protocol address of the degraded applications to logical and physical resources in the network based on the region.

10. The apparatus of claim 1, wherein the at least one processor is configured to adjust an allocation of network resources based on a service level metric and a service level agreement.

11. A method of measuring service levels in a wide area network, comprising:
    receiving end-to-end measurements of service usage collected at user devices for a plurality of applications hosted on the wide area network as cloud services;
    identifying degraded applications of the plurality of applications based on anomalies in the measurements;
    determining a service level metric based on an aggregation of the degraded applications; and
    adjusting an allocation of network resources based on the service level metric and a service level agreement.

12. The method of claim 11, wherein receiving the end-to-end measurements of service usage for at least one of the plurality of applications comprises receiving the end-to-end measurements from an application performance management service installed on the user devices.

13. The method of claim 11, wherein receiving the end-to-end measurements of service usage for an application of the plurality of applications comprises receiving third party measurements for the application.

14. The method of claim 11, wherein the end-to-end measurements are from a set of users that have opted in to an application performance management service, and wherein identifying degraded applications of the plurality of applications based on anomalies in the measurements comprises estimating measurements for all users based on the set of users that have opted in to the application performance management service.

15. The method of claim 11, wherein detecting the anomalies in the measurements comprises determining that the measurements indicate that at least one application was unavailable.

16. The method of claim 11, wherein the service usage includes a call from a user application to a platform as a service application that is accessed by the plurality of applications hosted as cloud services.

17. The method of claim 11, wherein determining the service level metric based on an aggregation of the degraded applications comprises determining an availability rate or end-to-end latency of the plurality of applications hosted on the wide area network.

18. The method of claim 11, further comprising:
    detecting a region and a uniform resource identifier (URI) of the degraded applications;
    mapping the URI and an internet protocol address of the degraded applications to logical and physical resources in the wide area network based on the region; and
    detecting an outage within the wide area network based on the mapping.

19. A system for monitoring a service level in a wide area network, comprising:
    a wide area network (WAN) including a plurality of geographically distributed physical computing resources and connections there between; and
    a service level component including a memory storing one or more parameters or instructions for monitoring a service level on the WAN and at least one processor coupled to the memory, wherein the at least one processor is configured to execute the instructions to:
        receive end-to-end measurements of service usage collected at user devices for a plurality of applications hosted on the wide area network as cloud services;
        identify degraded applications of the plurality of applications based on anomalies in the measurements;
        detect a region and an identifier of the degraded applications;
        creating a mapping of the identifiers of the degraded applications to a resource in a network based on the region; and
        detect an outage within the network based on the mapping.

20. The system of claim 19, wherein the at least one processor is further configured to:
    adjust an allocation of network resources based on a service level metric and a service level agreement.

* * * * *